United States Patent [19]

Kanai et al.

[11] Patent Number: 4,719,974
[45] Date of Patent: Jan. 19, 1988

[54] WALKING OPERATOR TYPE CULTIVATOR WITH AUTOMATIC CONTROL STOPPER

[75] Inventors: Naotaka Kanai, Miki; Nobuhide Yanagawa, Osaka, both of Japan

[73] Assignee: Kubota, Ltd., Osaka, Japan

[21] Appl. No.: 790,555

[22] Filed: Oct. 23, 1985

[30] Foreign Application Priority Data

Nov. 14, 1984 [JP] Japan ................. 59-240274
Feb. 4, 1985 [JP] Japan ................. 60-14530
Mar. 4, 1985 [JP] Japan ................. 60-42285
Mar. 4, 1985 [JP] Japan ................. 60-42286

[51] Int. Cl.$^4$ ............. A01B 63/111; B62D 51/04
[52] U.S. Cl. .......................... 172/2; 172/43
[58] Field of Search ............. 172/2, 3, 4, 4.5, 7, 172/42, 43; 56/10.2; 37/DIG. 1; 180/19.1, 19.2, 19.3

[56] References Cited

U.S. PATENT DOCUMENTS 4,263,973 4/1981 Boulais et al. ................. 172/4.5
4,567,949 2/1986 Herscher ..................... 172/42

FOREIGN PATENT DOCUMENTS 57-17021 1/1982 Japan ..................... 172/2
60-232011 11/1985 Japan ..................... 172/2
1455240 11/1976 United Kingdom ........... 172/43

Primary Examiner—Richard T. Stouffer
Attorney, Agent, or Firm—Jordan and Hamburg

[57] ABSTRACT

A walking operator type cultivator comprising a rotary plow, a ground engaging member for setting a plowing depth, and a position adjusting mechanism for raising and lowering the ground engaging member. The position adjusting member is automatically controllable according to signals transmitted by an inclination sensor detecting fore and aft inclinations of the cultivator. The cultivator further comprises a mechanism for stopping the automatic control of the position adjusting mechanism which is necessary under certain operating conditions of the vehicle. As a trigger for this control stopper mechanism a plowing clutch, a propelling system clutch or the inclination sensor is used.

10 Claims, 15 Drawing Figures

WALKING OPERATOR TYPE CULTIVATOR WITH AUTOMATIC CONTROL STOPPER

BACKGROUND OF THE INVENTION

This invention relates to an automotive cultivator of the type handled by a walking operator comprising a ground engaging member for setting a plowing depth and a position adjusting mechanism for raising and lowering the ground engaging member in order to maintain the cultivator at a posture so that the plowing depth is within a predetermined range.

With a walking operator type cultivator having a ground engaging member attached at a fixed height in order to achieve a constant plowing depth, a rotary plow carried by the cultivator will make a shallower engagement with the ground than a predetermined value when ground engaging drive wheels mount a ridge in the ground raising a front end thereof. Conversely, when the drive wheels run into a dent in the ground dipping the front end thereof, the rotary plow will make a deeper engagement with the ground than the predetermined value. In order to eliminate the variations in the plowing depth resulting from the changes in the cultivator posture due to undulations of the ground, it has been conventional to equip the cultivator with a ground engaging member adapted for manual vertical adjustment. However, with the walking operator type cultivator, the operator needs to hold a steering handle while plowing. It is difficult for him to hold the steering handle with one hand and vertically adjust the ground engaging member with the other. It is also difficult for the operator to correctly grasp amounts of cultivator posture variation resulting from undulations of the ground. Therefore, it is almost impossible to determine a correct amount of vertical movement of the ground engaging member, which in practice hampers good plowing depth adjustment. The plowing depth tends to vary greatly where there are undulations in the ground.

It is conceivable to maintain the plowing depth substantially constant in spite of undulations of the ground by equipping the walking operator type cultivator with a sensor for detecting fore and aft inclinations of the cultivator and by automatically raising and lowering the ground engaging member in response to signals from the sensor. Such a construction, however, has the following drawback. When the cultivator drives onto or down from a lorry bed or when the cultivator drives over a ridge between fields, the cultivator may assume a posture with its rear end lower than a position at which the rear end should be maintained under automatic control. Then the ground engaging member for setting a plowing depth is lowered under the automatic control, which pushes up the steering handle hampering cultivator handling. In order to prevent this, it is necessary for the operator to manually turn off a switch of the sensor or a switch of a mechanism for raising and lowering the ground engaging member so that the ground engaging member is not lowered. Moreover, the cultivator must frequently be inclined on purpose during a plowing operation notably when driving over a ridge between fields or making a U-turn. If the switch must be turned off on every such occasion, it will be too troublesome and make the automatic raising and lowering of the ground engaging member meaningless.

SUMMARY OF THE INVENTION

In order to eliminate the above drawback, the object of this invention is to provide a walking operator type cultivator comprising means responsive to operating conditions of the cultivator to automatically stop controls for raising and lowering of the ground engaging member based on signals transmitted by an inclination sensor.

In order to achieve the above object, a walking operator type cultivator according to this invention comprises an engine, drive wheels adapted to receive power of the engine through a propelling system clutch, a rotary plow adapted to receive the power of the engine through a plowing clutch, a ground engaging member for setting a plowing depth, a position adjusting mechanism for raising and lowering the ground engaging member, sensor means for detecting fore and aft inclinations of the cultivator, control means for automatically controlling the position adjusting mechanism in response to signals received from the sensor means, and control stopper means connected to the control means for stopping the automatic control according to operating conditions of the cultivator.

As noted above, the cultivator of this invention comprises the control stopper means for stopping the automatic ground engaging member raising and lowering control according to operating conditions of the cultivator. This construction is effective to release the ground engaging member from the automatic raising and lowering control according to certain operating conditions of the cultivator such as when the cultivator drives onto or down from a lorry bed or drives over a ridge between fields; on such occasions special operating conditions arise, namely, for example, disengagement of the plowing clutch and a cultivator inclination exceeding a certain degree. Thus, undesirable lowering of the ground engaging member is avoided on these occasions.

The foregoing and other objects and advantages of this invention will be apparent from the following description to be had with reference to the accompanying drawings illustrating cultivators embodying the invention by way of example.

DESCRIPTION OF THE PREFERRED EMBODIMENTS

Figure 1:
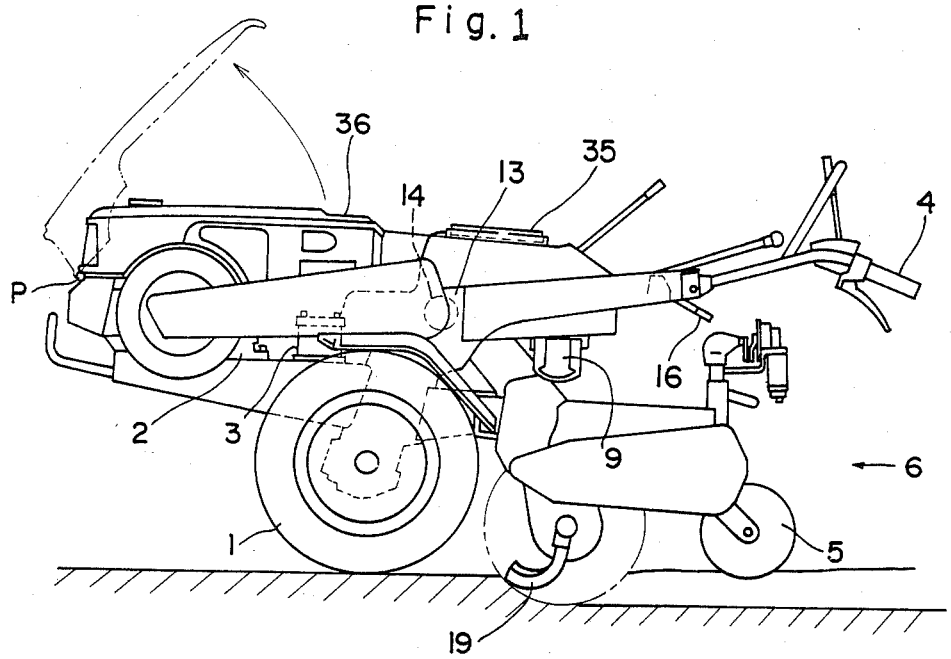
FIG. 1 is a side view of a walking operator type cultivator embodying this invention.

As shown in FIG. 1, a cultivator of the type handled by a walking operator comprises a pair of right and left drive wheels 1, a rotary plow 19 attached to the cultivator rearwardly of the drive wheel 1, an engine 2 mounted on a front portion of the cultivator, a transmission case 13, a steering handle 4 extending rearwardly of the cultivator, and a ground engaging tail wheel 5 disposed rearwardly of the rotary plow 19 and adapted to engage the ground after the rotary plow 19. The cultivator further comprises an inclination sensor 9 for detecting fore and aft inclinations of the cultivator, and a position adjusting mechanism 6 for automatically raising and lowering the tail wheel 5 in response to signals transmitted by the inclination sensor 9. The tail wheel 5 is vertically moved by the position adjusting mechanism 6 relative to the drive wheels 1 to maintain a plowing depth of the rotary plow 19 at a predetermined value.

Figure 5:
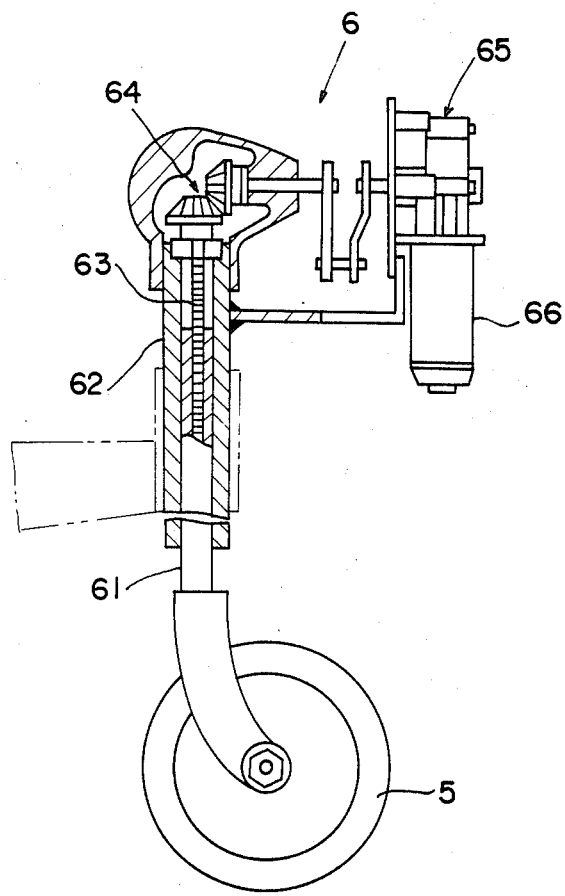
FIG. 5 is a partly broken away side view of a ground engaging member drive mechanism.

FIG. 5 shows details of the position adjusting mechanism 6 for the ground engaging tail wheel 5. The position adjusting mechanism 6 includes a support leg 61 of the tail wheel 5, a support sleeve 62 secured to a body portion of the cultivator and receiving the support leg 61, and a screw rod 63 axially immovably mounted in the support sleeve 62 and screwed axially into the support leg 61. The screw rod 63 is operatively connected at a top thereof through bevel gears 64 to a motor 66 having a reduction device 65. The motor 66 is operable to rotate the screw rod 63 which causes the support leg 61 to slide up and down in the sleeve 62 resulting in vertical movements of the tail wheel 5. The adjusting mechanism may of course comprise a hydraulic drive, for example, instead of the motor-screw type drive.

Figure 2:
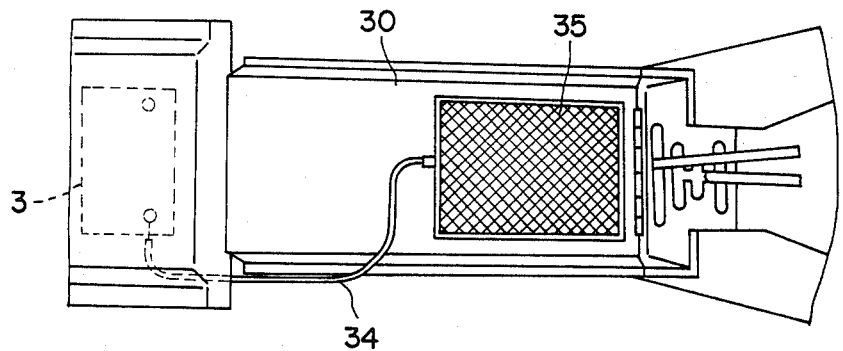
FIG. 2 is a schematic plan view of the cultivator showing a solar cell mounted thereon.

Reverting to FIG. 1, the cultivator comprises a hood 36 for covering the engine 2, which is pivotable on a transverse axis P at a forward end thereof. The engine 2 is connected to a battery 3 acting primarily as a power source for starting the engine 2. As shown also in FIG. 2, a battery charging solar cell 35 is mounted on a top face of the cultivator rearwardly of the hood 36, and more particularly on a top face of a frame 30 supporting the steering handle 4. Thus, the battery 3 is charged even when the cultivator stands idle with the engine 2 stopped, such as when the cultivator is left standing outdoors and when the engine 2 is repaired or serviced with the hood 36 open.

Figure 3:
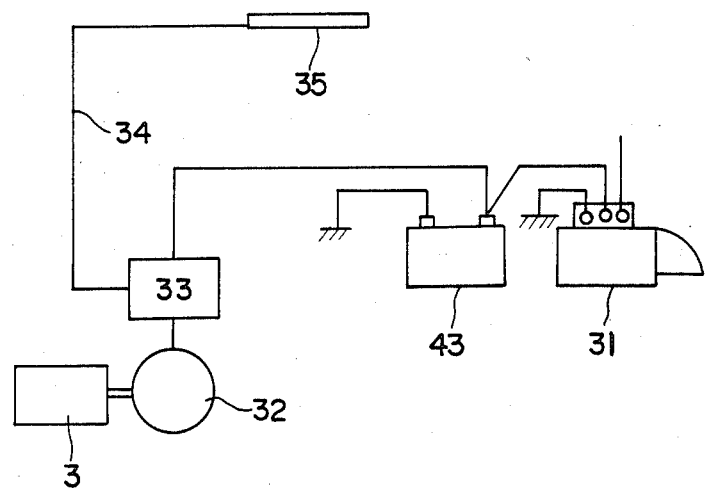
FIG. 3 is a view of an electric circuit for a solar cell system.

As shown in FIG. 3, the solar cell 35 is connected to a battery charger circuit 33 between a dynamo 32 and the battery 3. It will be understood that, even when the cultivator is left standing idle with the engine stopped, the battery is charged by the solar cell mounted on the cultivator to receive sunrays.

Moreover, since the solar cell is mounted on the top face of the cultivator rearwardly of the hood, the solar cell continues to receive sunrays and charge the battery also when the cultivator stands idle with the hood open such as for repairing or servicing the engine. This positional arrangement is free from the inconvenience of the hood obstructing reception of sunrays by the solar cell which would be the case if, for example, the solar cell were mounted on top of the hood.

Figure 4:
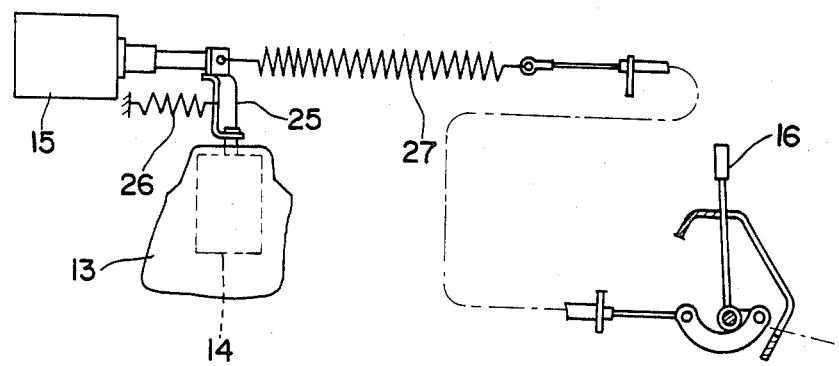
FIG. 4 is a side view of a plowing clutch operating mechanism.

The transmission case 13 houses a clutch 14 for establishing and breaking power transmission to the rotary plow 19. As shown in FIG. 4, this plowing clutch 14 has a swing arm 25 operatively connected to an electromagnetic solenoid 15 which when energized disengages the clutch 14, and to a hand lever 16 through a buffer spring 27 for manually operating the clutch 14. The clutch 14 is disengageable by the solenoid, owing to the buffer action of the spring 27, even when the hand lever 16 is in a position to engage the clutch 14. Number 26 in FIG. 4 denotes a spring for biasing the swing arm 25 to a declutching position.

Figure 6:
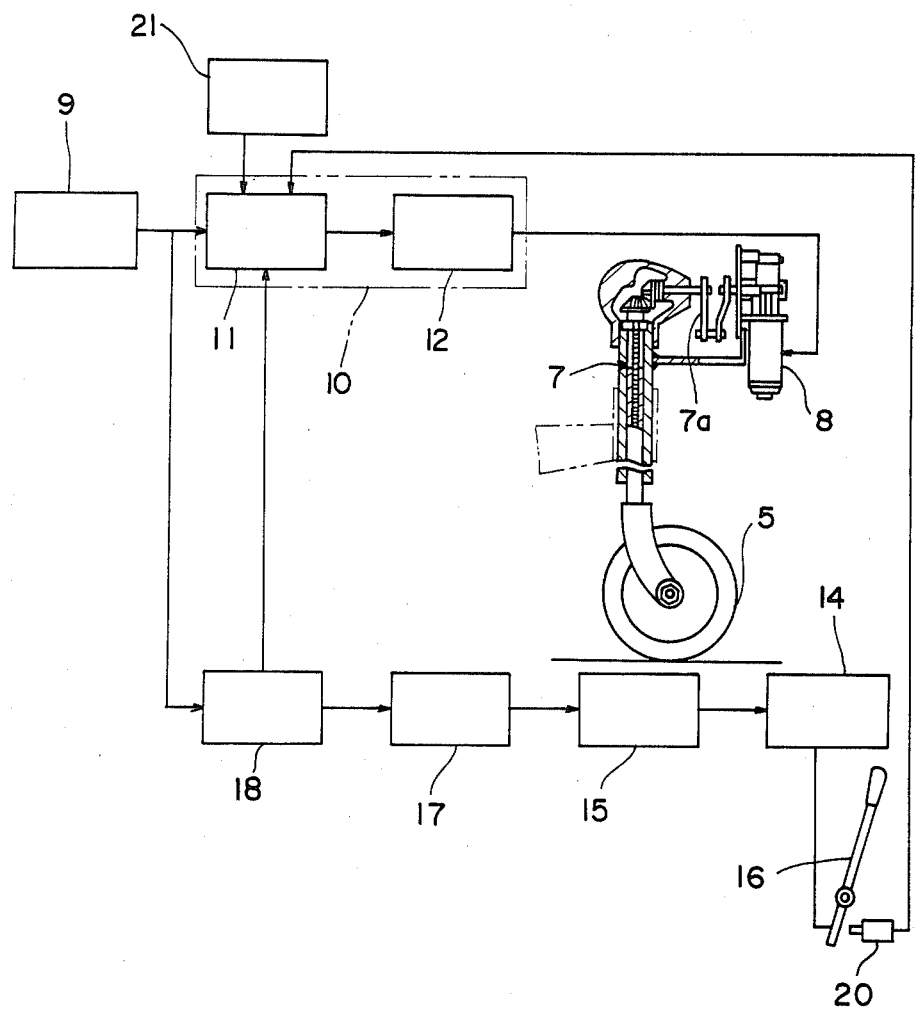
FIG. 6 is a block diagram of a control system according to a first embodiment.

Referring to FIG. 6, the inclination sensor 9 is mounted on the cultivator to detect a fore and aft inclination of the cultivator and transmit a corresponding electric signal to a first control device 10. The first control device 10 processes the signal and produces a target drive signal for the motor 8. The first control device 10 comprises a control circuit 11 and a motor drive circuit 12. The control circuit 11 receives the signal from the inclination sensor 9 and on the basis thereof outputs to the motor drive circuit 12 a control signal corresponding to a target amount of raising or lowering the ground engaging tail wheel 5, so that the detection by the inclination sensor comes within a predetermined range. The motor drive circuit 12 converts the control signal received from the control circuit 11 into the motor drive signal and transmits the latter to the motor 8. This mechanism is effective to maintain the plowing depth within the predetermined value in spite of vertical displacements of the tail wheel 5 following undulations of the ground.

Figure 7:
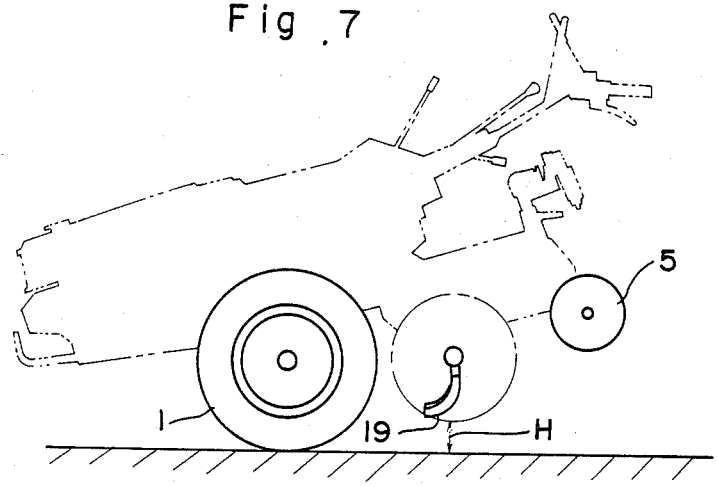
FIG. 7 is a side view showing a rotary plow as lifted from the ground.

The rotary plow is driven or stopped by the plow clutch 14 housed in the transmission case 13 and operable by both the electromagnetic solenoid 15 and the hand lever 16 as already described. The solenoid 15 has a drive circuit 17 connected to the inclination sensor 9 through a second control device 18. The second control device 18 provides signals through the drive circuit 17 to the solenoid 15 to engage the clutch 14 when the detection value of the inclination sensor 9 enters a first detection zone in which a cultivator inclination places the rotary plow 19 below a predetermined height H from the ground shown in FIG. 7, and to disengage the clutch 14 when the detection value of the inclination sensor 9 enters a second detection zone in which a cultivator inclination places the rotary plow 19 above the predetermined height H from the ground. Thus, the rotary plow 19 is automatically brought into and out of operation by inclining the cultivator to move the rotary plow 19 up and down relative to the ground.

A switch 20 is provided to detect whether the plow clutch 14 is engaged or disengaged, the switch 20 being connected to the first control device 10. When the switch 20 detects an "inoperative state" in which the plow clutch 14 is disengaged, the first control device 10 stops the automatic control for the ground engaging tail wheel based on the signals from the sensor 9. When the switch 20 detects an "operative state" in which the plow clutch 14 is engaged, the first control device 10 carries out the automatic control. In short, the switch 20 for detecting the positions of the plow clutch 14 acts as stopper means for the automatic raising and lowering control of the ground engaging tail wheel.

Figure 8:
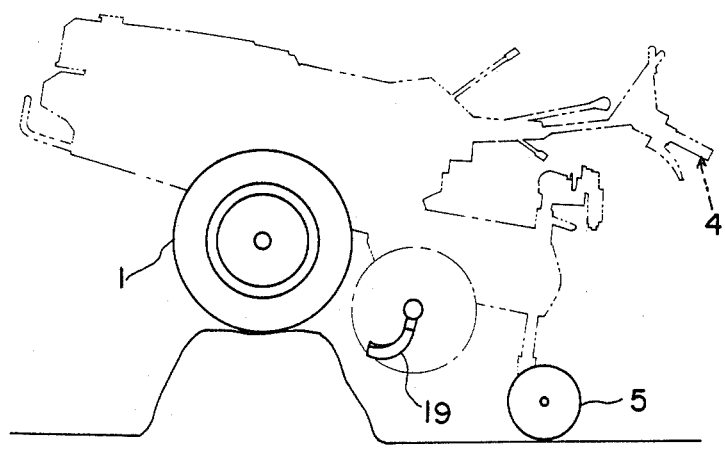
FIG. 8 is a side view of the cultivator driving over a ridge between fields.

Therefore, the automatic raising and lowering control of the tail wheel is stopped by disengaging the plow clutch 14 without turning off a main switch 21, in order that the steering handle 4 may not be pushed upward by a descent of the tail wheel 5 as when the cultivator moves over a ridge between fields as shown in FIG. 8 with a rear end dipped to a greater extent than a position maintained by the first control device 10.

The plow clutch position detecting switch 20 may carry out the detections on the basis of positions of the clutch operating hand lever 16, positions of a drive side rotary member of the plow clutch 14, or positions of a member interconnecting the rotary member and the hand lever 16.

Figure 9:
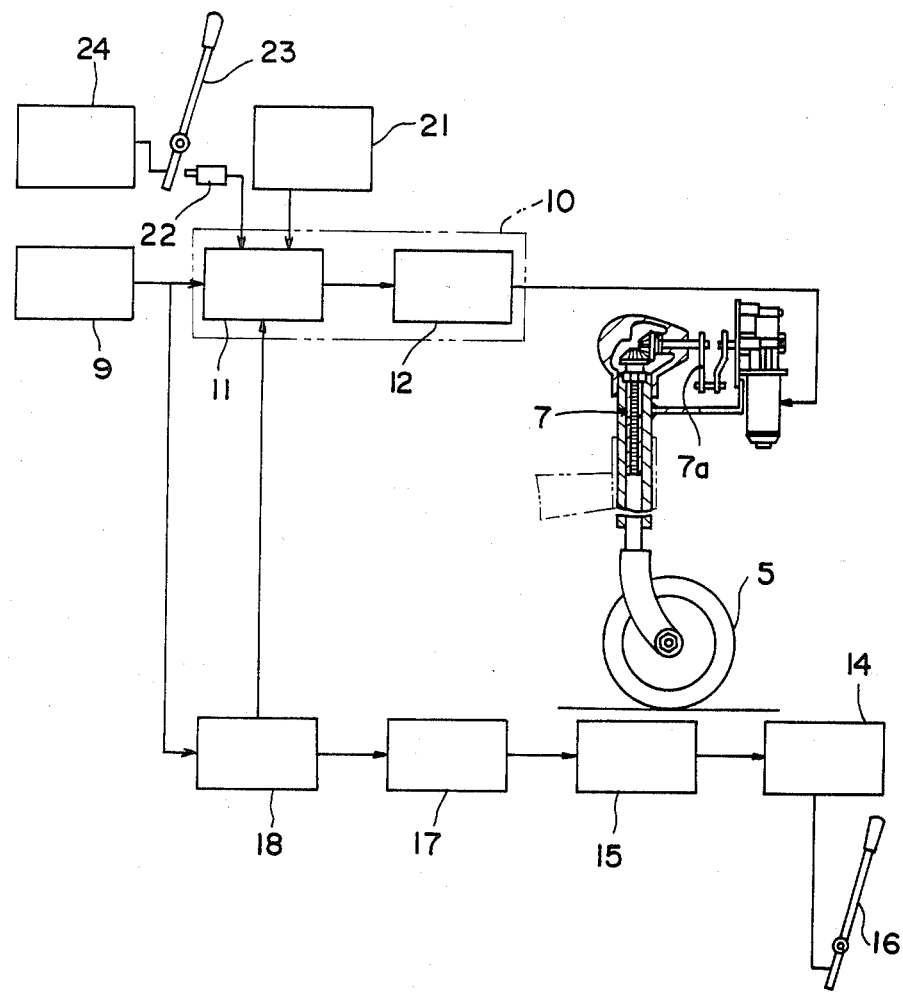
FIG. 9 is a block diagram of a control system according to a second embodiment.

In the described embodiment, the plow clutch is used as a trigger for stopping the automatic control for raising and lowering the tail wheel or ground engaging member for setting the plowing depth. In an alternative embodiment a propelling system clutch may be used as a trigger. If, for example, at the beginning of work the plow is brought close to the ground to facilitate its positional adjustment relative to furrows or other spots in a field to be treated, the rear end of the cultivator is raised to a greater extent than the position maintained by the control device as when the ground engaging member mounts a projection of the ground. Then the ground engaging member for setting the plowing depth will move vertically near the operator's feet under the automatic control. This embodiment eliminates such an inconvenience by disengaging the propelling system clutch which simultaneously stops the automatic control to move the ground engaging member up and down. As shown in FIG. 9 in which most constituent elements are the same as in FIG. 6 and like numerals are affixed to like elements, this automatic control system includes a switch 22 connected to the first control device 10 instead of the switch for detecting whether the plow clutch 14 is engaged or disengaged. A main clutch 24 is disposed between the engine 2 and the transmission case 13 to drive or stop the drive wheels 1, and the switch 22 is adapted to detect whether the main clutch 24 is engaged or disengaged. When the switch 22 detects an "inoperative state" in which the main clutch 24 is disengaged, the first control device 10 stops the automatic control for the ground engaging tail wheel based on the signals from the sensor 9. When the switch 22 detects an "operative state" in which the main clutch 24 is engaged, the first control device 10 carries out the automatic control. In short, the switch 22 for detecting the positions of the main clutch 24 acts as stopper means for the automatic raising and lowering control of the ground engaging tail wheel.

As described before, this embodiment stops the automatic control for moving the ground engaging member up and down, by disengaging the main clutch 24 without turning off the main switch 21, when the rear end of the cultivator is raised to a greater extent than the position maintained by the control device to positionally adjust the rotary plow relative to furrows or other spots in a field to be treated.

The main clutch position detecting switch 22 may carry out the detections on the basis of positions of a main clutch operating hand lever 23, positions of a drive side rotary member of the main clutch 24, or positions of a member interconnecting the rotary member and the hand lever 23.

As a further embodiment, the signal produced by the inclination sensor may be used as the trigger for stopping the automatic control for raising and lowering the ground engaging member for setting the plowing depth. While the signal produced by the inclination sensor is used to determine the target control amount for raising or lowering the ground engaging member, a limit value is set to the detection value of the sensor so that the automatic control is effected when the detection value is below the limit value and the automatic control is stopped when the detection value is above the limit value.

Figure 11:
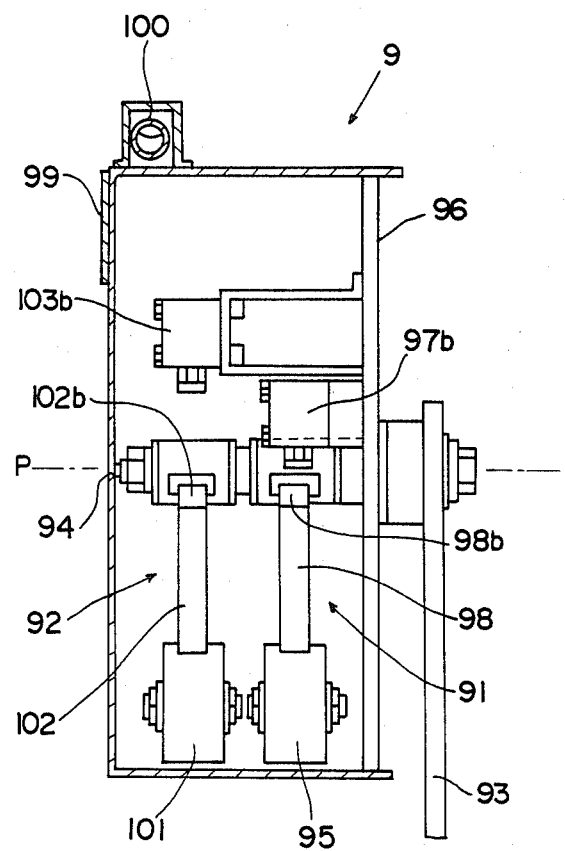
FIG. 11 is a side view of an inclination sensor.
Figure 12:
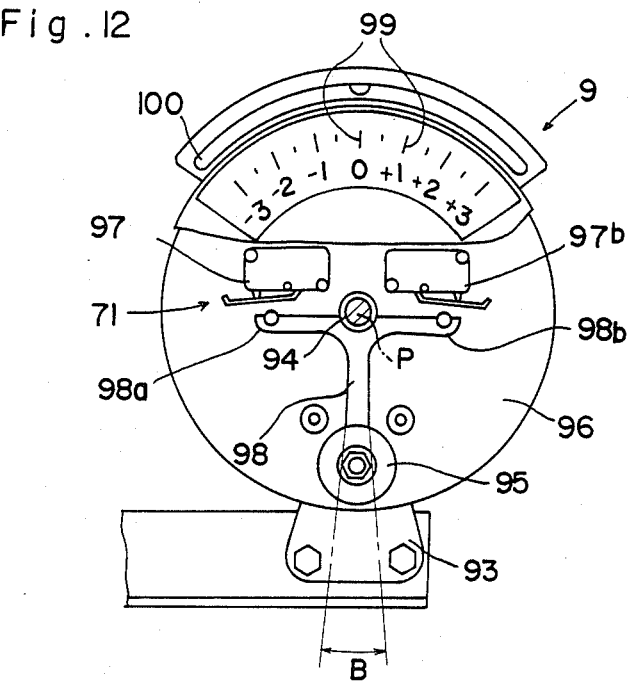
FIG. 12 is a front view of a first sensor element.
Figure 13:
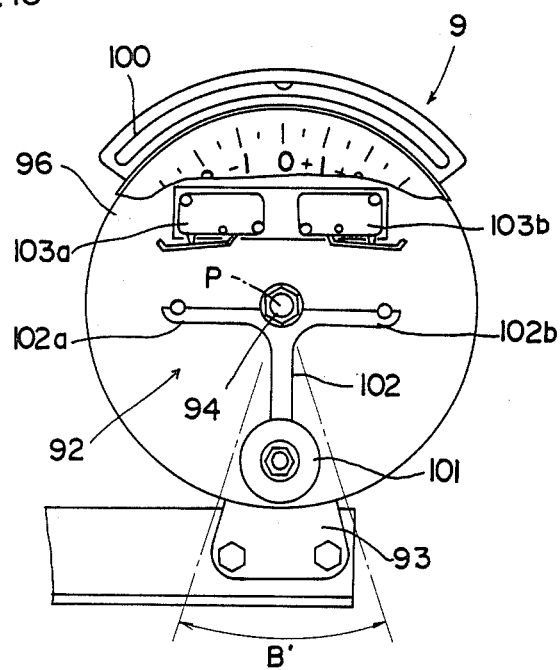
FIG. 13 is a front view of a second sensor element.

As shown in FIGS. 11 through 13, the inclination sensor 9 includes a first inclination sensor 91 to transmit an input signal for producing the target control amount for automatically raising and lowering the ground engaging member, and a second inclination sensor 92 to provide a signal functioning as the trigger for stopping the automatic raising and lowering control of the ground engaging member.

The first inclination sensor 91 comprises a weight 95 depending from a transverse support shaft 94 attached to a cultivator frame 93 to be oscillatable about an axis P of the support shaft 94, a pair of right and left switches 97a and 97b attached to a disk 96 mounted on the support shaft 94 and opposed to each other across the weight 95, and contact members 98a and 98b defined on a support arm 98 supporting the weight 95 and opposed to the switches 97a and 97b, respectively. One of the contact members 98a or 98b contacts one of the switches 97a or 97b by an oscillation of the weight 95 beyond a predetermined range B. In other words, the weight 95 is within the predetermined range B when the switch 97a or 97b is out of action. At this time the weight 95 does not detect an inclination exceeding the predetermined value, and the tail wheel is locked against vertical movement to maintain the plowing depth constant regardless of slight undulations of the field surface. This range, therefore, is intended for a range of insensitivity zone. When one of the switches 97a or 97b is activated, it means that the cultivator has inclined toward that switch to an extent exceeding the predetermined value. The switch 97a or 97b then transmits a signal through the drive circuit 12 to the motor 8 to raise or lower the tail wheel 5 in order to return the cultivator to a horizontal posture and to permit the rotary plow 19 to follow inclinations of the field surface.

Figure 14:
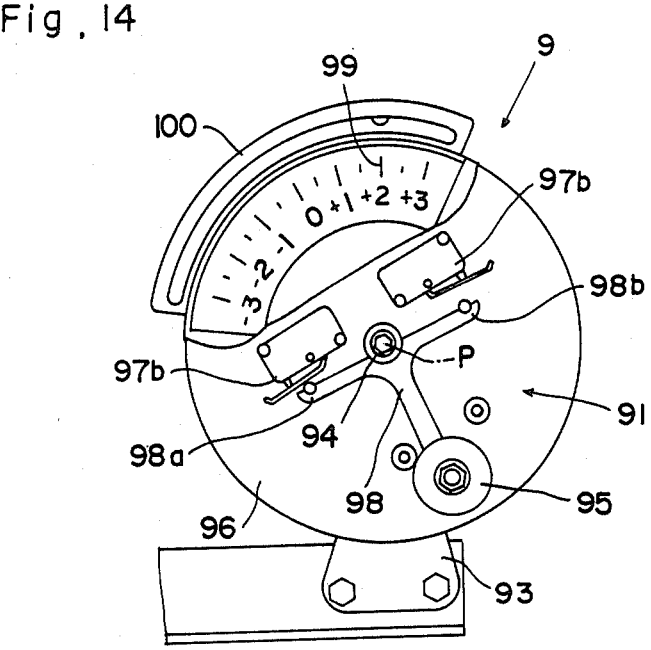
FIG. 14 is a front view of the first sensor element assuming a position for setting a plowing depth.

As shown in FIG. 14, the disk 96 carrying the switches is frictionally fixable to the transverse support shaft 94 and manually rotatable against the friction. The disk 96 has a scale 99 for setting the plowing depth and the cultivator frame has a bubble type level 100. Prior to a plowing operation, the level 100 is adjusted so that the cultivator is in the horizontal posture and then the disk 96 is manually rotated to set to a predetermined division of the scale corresponding to a desired plowing depth. The tail wheel 5 is raised and lowered according to the set value whereby the rotary plow 19 achieves the predetermined plowing depth.

As shown in FIGS. 11 and 13, the second inclination sensor 92 comprises a weight 101 depending from the transverse support shaft 94 to be oscillatable about the axis P of the support shaft 94, and contact members 102a and 102b defined on a support arm 102 supporting the weight 101 and opposed to the switches 103a and 103b, respectively. One of the contact members 102a or 102b contacts one of the switches 103a or 103b by an oscillation of the weight 101 beyond a predetermined range B' which is larger than the predetermined range B of the first inclination sensor 91. In other words, compared with the first inclination sensor 91 the second inclination sensor 92 is activated only when the cultivator inclines dipping the front end to an extent exceeding the predetermined inclination, namely beyond the limit value for the automatic raising and lowering control.

Figure 10:
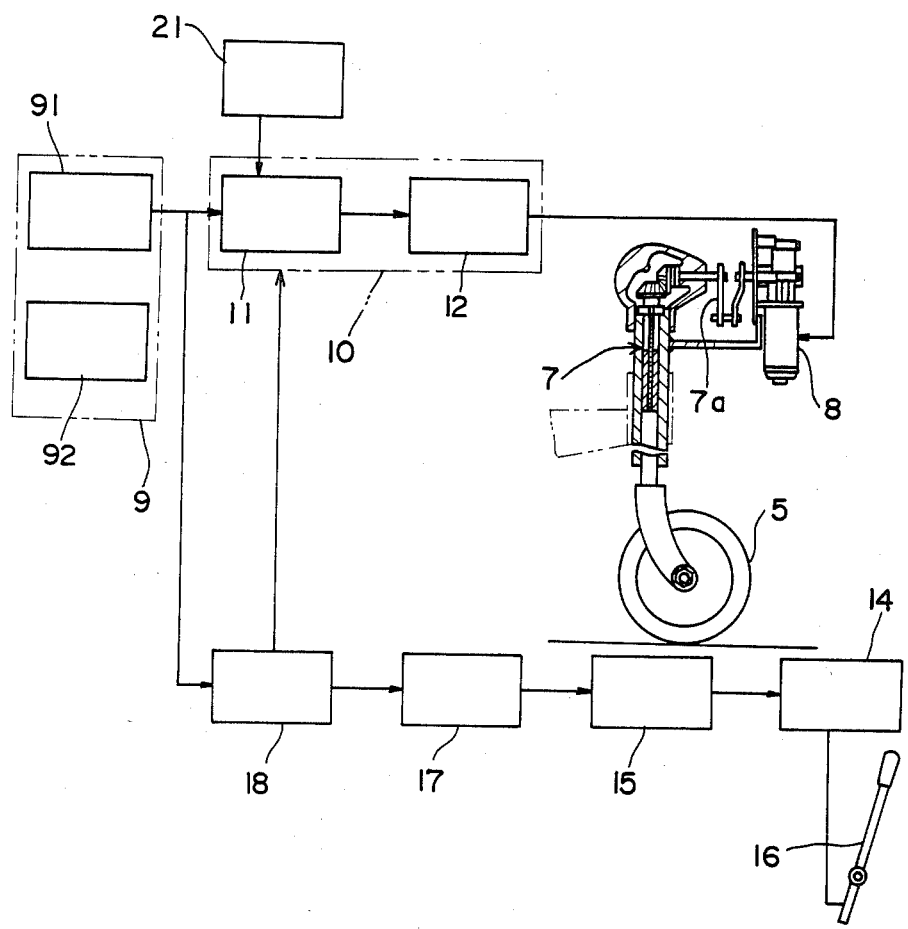
FIG. 10 is a block diagram of a control system according to a third embodiment.

The control system shown in FIG. 10 is essentially the same as those shown in FIGS. 6 and 9, and like numerals are affixed to like components. The first and second sensors 91 and 92 transmit signals to the first control device 10. The second sensor 92 detects an inclination of the cultivator dipping the front end to a substantial degree and pulling up the rotary plow 19 out of the ground at times of turning round the cultivator, whereby the automatic raising and lowering control is stopped. At the same time the electromagnetic solenoid 15 for the rotary plow is activated to automatically stop the rotary plow 19 raised from the ground to ensure safety. When the second sensor 92 is out of action, the first sensor 91 transmits the signal for automatically raising or lowering the ground engaging tail wheel.

It will be noted that an electromagnetic clutch may be used as the clutch 14 for driving and stopping the rotary plow 19.

Figure 15:
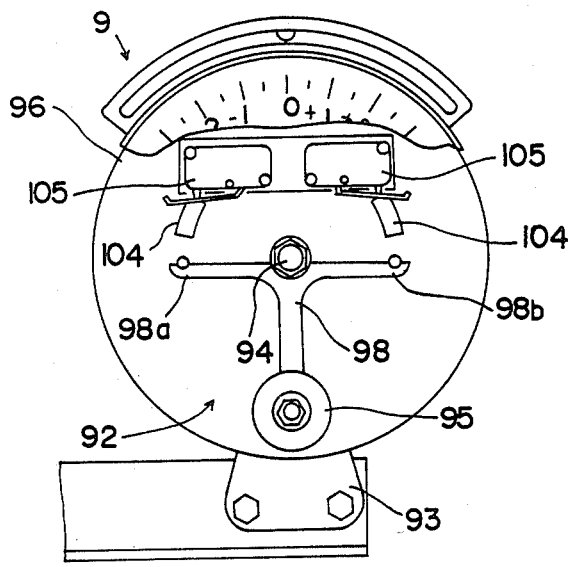
FIG. 15 is a front view of a modified inclination sensor.

The inclination sensor 9 may be modified as shown in FIG. 15. This inclination sensor 9 comprises a weight 95 depending from the transverse support shaft 94 to be oscillatable about the axis of the support shaft 94, and contact members 98a and 98b defined on the support arm 98 for contacting a switch device. The contact member 98a or 98b contacts the switch device by an oscillation of the weight 95 resulting from an inclination of the cultivator, thereby to detect the inclination. The switch device includes contact switches 104 comprising piezoelectric elements contactable to detect a cultivator inclination within a small range, and microswitches 105 contactable when the cultivator inclination exceeds the above small range and reaches a certain predetermined value. Thus, the modified inclination sensor comprises a single sensor.

What is claimed is:

1. In a walking-operator type cultivator comprising an engine, drive wheels adapted to receive power of the engine through a propelling system clutch, a rotary plow adapted to receive the power of the engine through a plowing clutch, a ground engaging member for setting a plowing depth, a position adjusting mechanism for raising and lowering the ground engaging member, sensor means for detecting fore and aft inclinations of the cultivator, automatic position control means for automatically controlling the position adjusting mechanism in response to signals received from the sensor means, the improvement comprising control stopper means connected to the automatic position control means for automatically inhibiting operation of the automatic position control means in response to said signals for avoiding movement of said ground engaging member to a position during non-plowing operations that interferes with movement of the cultivator.

2. A cultivator as claimed in claim 1 comprising a plowing clutch, wherein the control stopper means is operatively connected to the plowing clutch and adapted to stop the automatic control of the position adjusting mechanism by the automatic position control means when the plow clutch is disengaged.

3. A cultivator as claimed in claim 1 wherein the control stopper means is operatively connected to the propelling system clutch and adapted to stop the automatic control of the position adjusting mechanism by the automatic position control means when the propelling system clutch is disengaged.

4. A cultivator as claimed in claim 3 wherein the propelling system clutch comprises a main clutch.

5. A cultivator as claimed in claim 1 wherein the control stopper means is connected to the sensor means and adapted to stop the automatic control by the automatic position control means when the cultivator inclines with a front end thereof dipping by an angle exceeding a predetermined angle.

6. A cultivator as claimed in claim 1 comprising a plowing clutch, further comprising plowing clutch control means adapted to engage the plowing clutch when an inclination angle detected by the sensor means is below a predetermined threshold value for the plowing clutch and to disengage the plowing clutch when the inclination angle exceeds the predetermined threshold value.

7. A cultivator as claimed in claim 6 wherein the control stopper means is operatively connected to the plowing clutch and adapted to stop the automatic control of the position adjusting mechanism by the automatic position control means when the plow clutch is disengaged.

8. A cultivator as claimed in claim 6 wherein the control stopper means is operatively connected to the propelling system clutch and adapted to stop the automatic control of the position adjusting mechanism by the automatic position control means when the propelling system clutch is disengaged.

9. A cultivator as claimed in claim 8 wherein the propelling system clutch comprises a main clutch.

10. A cultivator as claimed in claim 6 wherein the control stopper means is connected to the sensor means and adapted to stop the automatic control by the automatic position control means when the cultivator inclines with a front end thereof dipping by an angle exceeding a predetermined angle.

* * * * *